United States Patent
Tracy

(12) United States Patent (10) Patent No.: US 11,279,169 B2
Tracy (45) Date of Patent: Mar. 22, 2022

(54) PAINT TRAY FOR USE WITH ROLLERS AND BRUSHES

(71) Applicant: Martin Todd Tracy, North Myrtle Beach, SC (US)

(72) Inventor: Martin Todd Tracy, North Myrtle Beach, SC (US)

(*) Notice: Subject to any disclaimer, the term of this patent is extended or adjusted under 35 U.S.C. 154(b) by 0 days.

(21) Appl. No.: 16/270,506

(22) Filed: Feb. 7, 2019

(65) Prior Publication Data
US 2019/0241012 A1 Aug. 8, 2019

Related U.S. Application Data

(60) Provisional application No. 62/628,059, filed on Feb. 8, 2018.

(51) Int. Cl.
*B44D 3/12* (2006.01)
*B29C 37/00* (2006.01)
*B29L 31/22* (2006.01)

(52) U.S. Cl.
CPC .......... *B44D 3/126* (2013.01); *B29C 37/0053* (2013.01); *B44D 3/123* (2013.01); *B29L 2031/22* (2013.01)

(58) Field of Classification Search
CPC .... B44D 3/126; B44D 3/123; B29C 37/0053; B05C 21/00
USPC .......... 15/257.05, 257.06; 220/570
See application file for complete search history.

(56) References Cited

U.S. PATENT DOCUMENTS

| | | | | |
|---|---|---|---|---|
| 5,207,348 A | * | 5/1993 | Fischer | B44D 3/123 220/697 |
| 5,810,196 A | * | 9/1998 | Lundy | B44D 3/128 220/23.8 |
| 6,102,235 A | * | 8/2000 | Stern | B44D 3/126 15/257.06 |
| 7,311,219 B1 | * | 12/2007 | Kallas | B44D 3/126 15/257.05 |
| 2006/0226156 A1 | * | 10/2006 | Lundy | B44D 3/123 220/570 |

* cited by examiner

*Primary Examiner* — Monica S Carter
*Assistant Examiner* — Katina N. Henson

(57) ABSTRACT

A paint delivery tool or paint tray, suitable for use in a paint bucket, includes a paint roller grid mounted to a shelf that includes an auxiliary paint receptacle or cut bucket intended for separate use with a paint brush. The upper shelf includes a semicircular rim and lip for mounting the tool or paint tray to the top of a circular bucket. The paint roller grid extends from an opposite straight edge of the shelf and downward into the paint bucket. A paint roller and a paint brush can then be stored and used separately to reduce waste, messes and clean up. The paint roller grid and the shelf can be an integral one piece member, and they can be joined by a living hinge if molded as a plastic member.

20 Claims, 5 Drawing Sheets

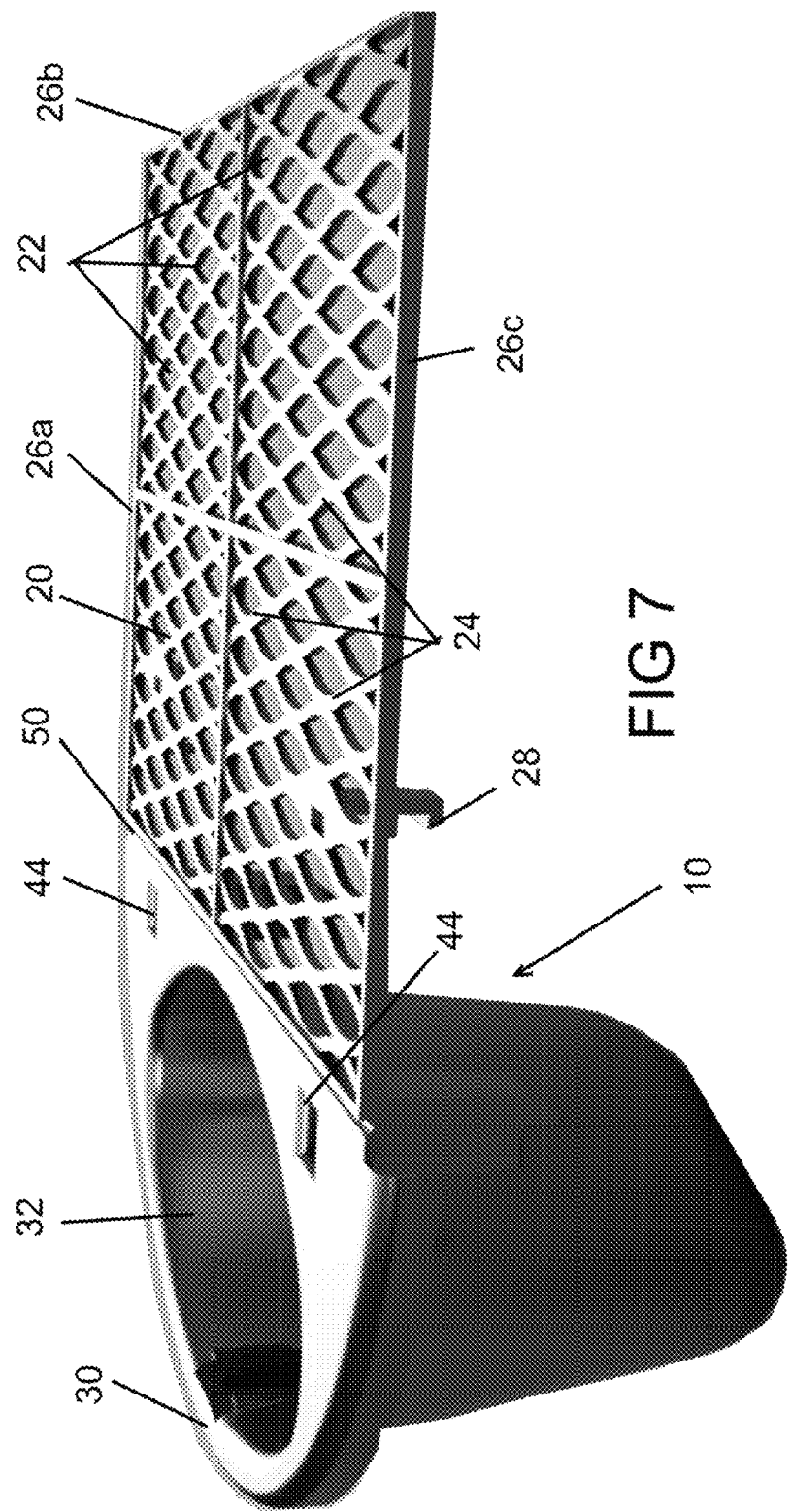

PAINT TRAY FOR USE WITH ROLLERS AND BRUSHES

CROSS REFERENCE TO PRIOR CO-PENDING APPLICATIONS

This application claims benefit of prior U.S. Provisional Patent Application 62/628,947 filed Feb. 8, 2018.

BACKGROUND OF THE INVENTION

Field of the Invention

This invention relates to a paint delivery tray that can be mounted on a cylindrical bucket and will assist a painter when using a paint roller and one or more paint brushes to paint a structure such as a wall or ceiling.

Description of the Prior Art

Painters typically employ paint brushes and paint rollers to apply paint to ceilings and walls. Typically the painter will have to use a ladder or scaffold to apply paint at an elevated location. When the painter is using a paint roller, he or she will employ either a paint tray or a bucket as a paint reservoir to load paint onto the paint roller. A paint tray generally employs a shallow inclined surface extending into a paint reservoir. The roller picks up paint in the reservoir and then rolls the paint roller along the shallow inclined surface to evenly distribute paint on the roller so that the paint can be transferred to a structure, such as a wall or a ceiling. It can be a problem to position or secure a shallow inclined paint tray on a ladder. U.S. Pat. No. 9,506,293 shows one mechanism for securing a paint tray of this type to a ladder.

A common practice is for a paint to partially fill a bucket, such as a common plastic five gallon bucket, and use this bucket as the paint reservoir. A relatively large amount of paint can be carried in such a bucket, and it is relatively easy for the painter to carry a bucket up a ladder. In order to evenly distribute the paint in the bottom of the bucket onto the roller, a painter can use a paint roller grid or draining grid that can be suspended from the top of a bucket and can extend into the bucket at a relatively steep angle. An array of openings can be formed in a conventional paint roller grid by a matrix of laterally extending members in a mesh configuration. After the roller is dipped into paint in a bucket the roller is rolled upward along the grid to evenly distribute the paint on the roller, with excess paint passing through the openings and draining back into the bucket. An example of one such paint roller grid is shown in U.S. Pat. No. 6,119,303.

Conventional paint roller trays or paint roller grids are effective in evenly distributing paint on a paint roller. However, a painter will need to use one or more paint brushes, along with a paint roller on a typical painting job. Paint rollers are not as efficient as paint brushes for applying paint in tight area or along trim or in corners, especially in elevated areas. When using a bucket and a paint roller grid, the painter can dip a brush in the paint bucket reservoir, but the paint roller grid and the paint roller will constrict space in the bucket, making it messy to use a paint brush in this manner and complicating clean up after the job. For example, if the brush is placed in the bottom of the bucket, paint will get on the brush handle as well as on the bristles and the more paint will get on the painter's hands and clothes. The instant invention provides an auxiliary paint reservoir or cut bucket mounted on a paint roller grid especially for storing brushes when not in use and for transferring paint in the auxiliary cut bucket to the paint bristles, resulting in a neater job with less clean up.

SUMMARY OF THE INVENTION

According to one aspect of this invention, a paint delivery tool that can be inserted in a paint bucket and used with a paint roller to apply paint to a structure includes a paint roller grid in which an array of openings are formed so that the grid evenly distributes paint on the paint roller moving along and engaging the paint roller grid. The tool also includes a shelf from which the paint roller grid extends. The shelf has a lip that engages the rim of a paint receptacle or paint bucket so that the paint roller grid can be suspended in a paint bucket. The shelf contains an auxiliary paint receptacle or cut bucket beside the paint roller grid. The auxiliary paint receptacle or cut bucket has a volume sufficient to receive a paint brush in an upright position with paint bristles extending into paint disposed in the auxiliary paint receptacle. Paint can be separately contained in the paint bucket and the auxiliary paint receptacle or cut bucket so that a painter can both use and separately store the paint roller and the paint brush while painting the structure while reducing messiness and facilitating clean up.

A tray, according to another aspect of this invention is also for use in a paint bucket and with a paint roller. This paint delivery tray has an upper section and a paint roller grid extending downwardly from the upper section. The upper section has a semicircular periphery with a lip configured to fit over a portion of a top edge of the paint bucket when the paint tray is mounted on top of the paint bucket. The paint roller grid extends from a straight edge of the upper section, opposite from the semicircular periphery. The paint roller grid has an array of openings so that the grid evenly distributes paint on the paint roller moving along the paint roller grid within the paint bucket when the upper section is mounted on top of the paint bucket.

Also according to this invention the tray is mountable on a bucket containing paint and for use with a paint roller and a paint brush. The paint tray includes an auxiliary paint receptacle or cut bucket on the tray and separate from the bucket. This auxiliary paint receptacle is configured for positioning the paint brush in the auxiliary paint receptacle in an upright position. The paint roller grid extends into the bucket when the tray is mounted on the bucket. The paint roller grid is joined to the portion of the tray containing the auxiliary cut bucket by a hinge.

A significant advantage of the tray of this invention is that only one bucket need be used for a painter for applying paint with both a roller and a bucket. When climbing a ladder or mounting a scaffold, the painter need only carry one bucket, which is a significant practical advantage. This paint tool also has a safety aspect. This painting tool combines a cut bucket and a roller grid bucket into one component. When climbing a ladder to paint soffits and siding a painter will only need on bucket with this invention. One bucket means that it is less cumbersome and less difficult to take it up the ladder and attach the single bucket to the ladder with a pot hook. Fewer tools to carry up the ladder and less tools to secure to ladder equals safer work, especially when a painter is twenty feet off the ground.

BRIEF DESCRIPTION OF THE DRAWINGS

FIG. 7 is a three dimensional view of one version of the paint deliver tray, which could be fabricated as an integral, one piece, molded component with the paint roller grid attached by a living hinge to the portion of the tray with the cut bucket. The paint roller grid would be rotated about the intermediate hinge to the operative paint tray position shown in FIGS. 1-6.

DETAILED DESCRIPTION OF THE PREFERRED EMBODIMENT

Figure 1:
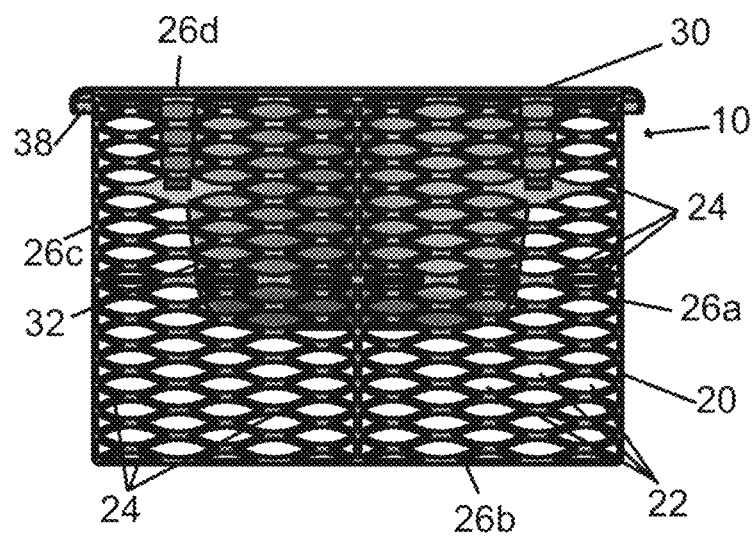
FIG. 1 is a side elevational view of the paint delivery tray according to this invention showing a paint roller grid in front of an auxiliary paint receptacle or cut bucket.
Figure 2:
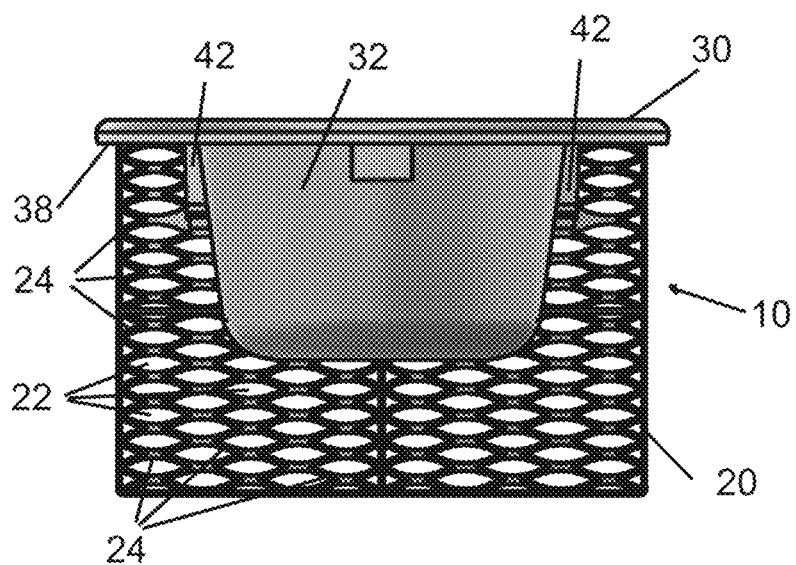
FIG. 2 is also a side elevational view of the paint delivery tray of FIG. 1, but with the auxiliary paint receptacle or cut bucket in front of the paint roller grid.

The paint tray or paint delivery tray 10 according to this invention is intended for use by a painter in conjunction with a conventional paint bucket 2, such as an open top five gallon bucket, with a conventional paint roller 4 and with a paint brush 6, which would normally be used to paint trim or spaces that are not easily accessible with a roller. The preferred embodiment of paint tray 10 intended for use with a conventional five gallon plastic bucket will allow a painter to use any size roller up to a standard nine inch roller. Of course embodiments and sizes differing from the representative version describe herein could also employ a paint tray of the type described herein, and dimensions discussed herein should not be considered limiting.

Paint tray 10 includes a paint roller tray 20 that would be employed with a conventional paint roller 4 and an auxiliary paint receptacle or cut bucket 32 with which a paint brush 6 would be used. A painter would normally pour the majority of the paint, which would be used for a job, in a conventional open top paint bucket 2, such as a plastic five gallon bucket. The painter would dip a paint roller 4 in the paint contained in the bucket 2, and would then roll or slide the paint roller 4 along the paint roller grid 20 to evenly distribute paint on the roller 4 and remove excess paint. In addition to the paint poured into the bucket 2, a small amount of paint would be poured into the auxiliary paint receptacle or cut bucket 32 in which a paint brush 6, suitable to touch up or for use in painting trim or areas not easily accessible with a paint roller 4. The upwardly open cut bucket 32 would also provide space for carrying a paint brush 6 with the paint brush bristles 6a submerged in the paint in the cut bucket 32, but with the brush handle 6b extending above the paint in cut bucket 32. A latch 40 for attaching a paint brush is located near the top of the auxiliary cut bucket 32. The paint handle 6b would then remain clean, reducing necessary clean up when a job is finished.

Figure 3:
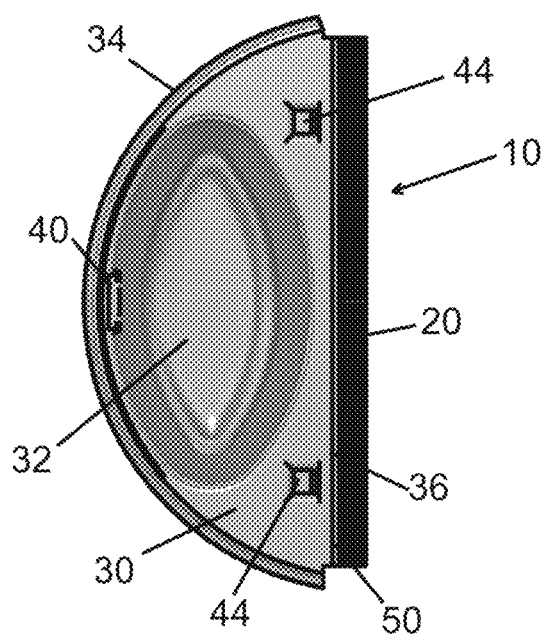
FIG. 3 is a top view of the paint delivery tray looking into the auxiliary paint receptacle or cut bucket beside the paint roller grid.
Figure 4:
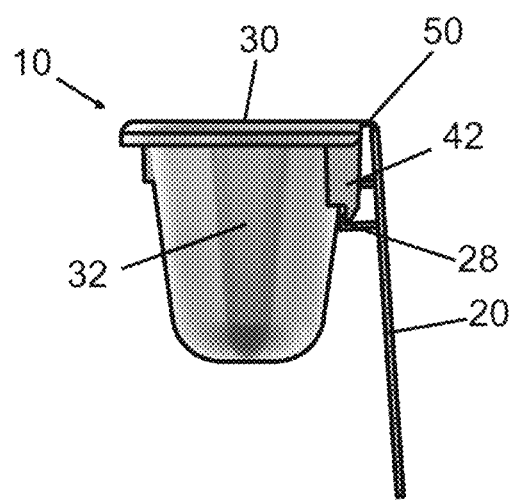
FIG. 4 is a elevational view of one end of the paint delivery tray showing the paint roller grid beside the auxiliary paint receptacle or cut bucket.
Figure 5:
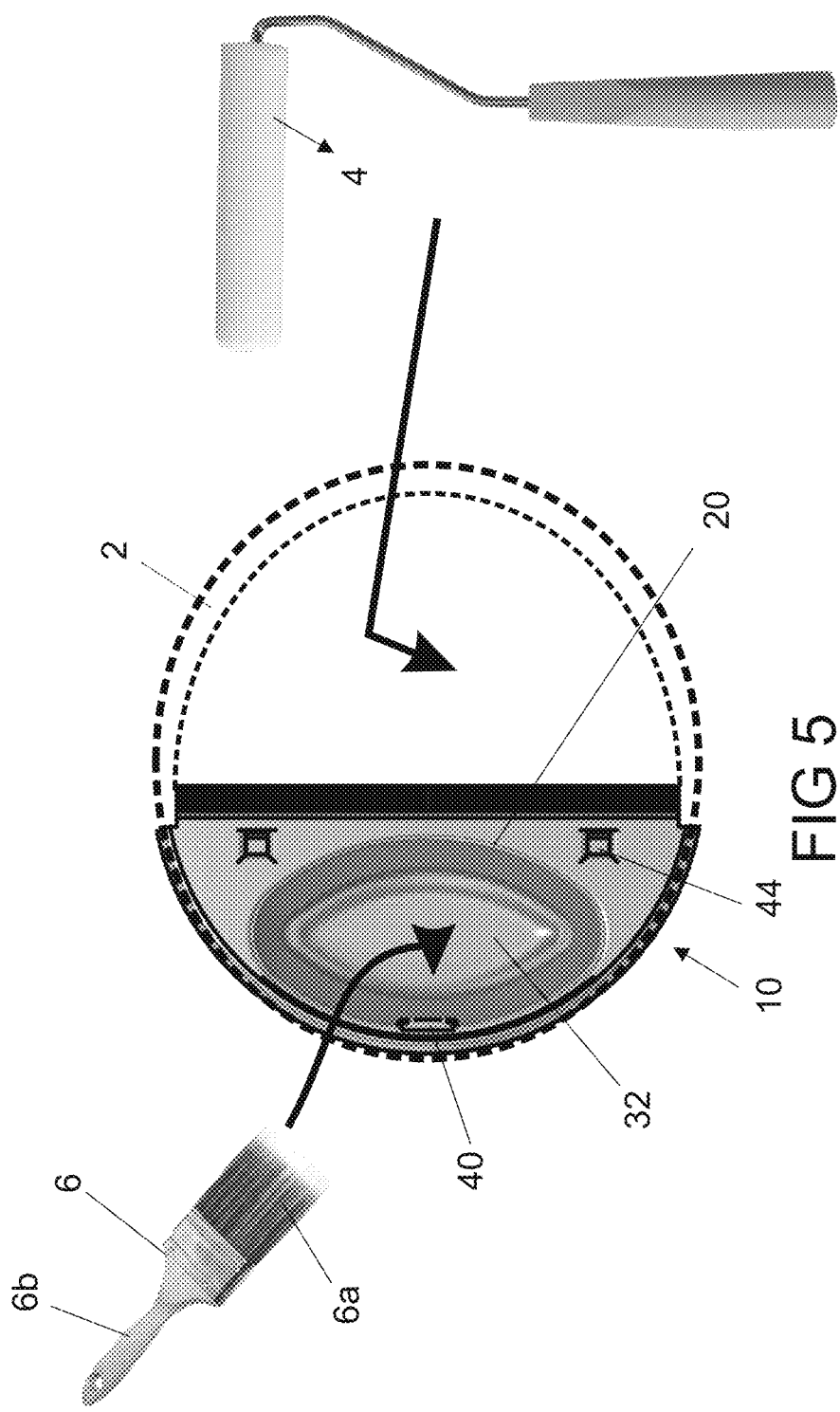
FIG. 5 is a top view showing the position of the paint delivery tray mounted on top of a bucket, such as for example a five gallon bucket depicted by phantom lines, commonly employed by a house painter or one who paints structures or walls.

The auxiliary paint receptacle or cut bucket 32 is a recessed section in an upper section or shelf 30 that has a semicircular shape. A semicircular peripheral edge 34 extends between opposite ends of a straight peripheral edge 36 to define the shelf or upper section 30, The radius of curvature defining the semicircular edge 34 is chosen to be equal to the size of the paint bucket 2 with which the paint delivery tray 10 is to be employed. If the paint deliver tray 10 is to be used with a five gallon plastic bucket this radius of curvature will be equal to the radius of the upper edge of the five gallon bucket, which is approximated standard for buckets 2 of this type. A semicircular downwardly facing lip 38 extends around the semicircular peripheral edge 34 of the shelf or upper portion 30. The width of this lip is sufficient to allow this lip 38 to fit over the top of a bucket 2, so that the paint tray 10 can be securely mounted on a bucket 2. The open end of the auxiliary cut bucket 32 is best seen in FIGS. 3 and 5, and the height of this tapered auxiliary cut bucket 32 is best seen in FIGS. 1, 2, 4 and 6. The open end of the auxiliary cut bucket 32 has a curved shape as seen in FIGS. 3 and 5. The depth of this cut bucket should be at least equal to the height of the bristles 6a of the paint brush 6 which would be commonly employed. The auxiliary cut bucket 32 is located adjacent to the semicircular peripheral edge 34. Two openings 44 are located between the auxiliary cut bucket 32 and the straight peripheral edge 36. These openings 44 are adjacent to the straight peripheral edge 36 and are located above shoulders 42 for manufacturing considerations to be further discussed with reference to FIG. 7.

Figure 6:
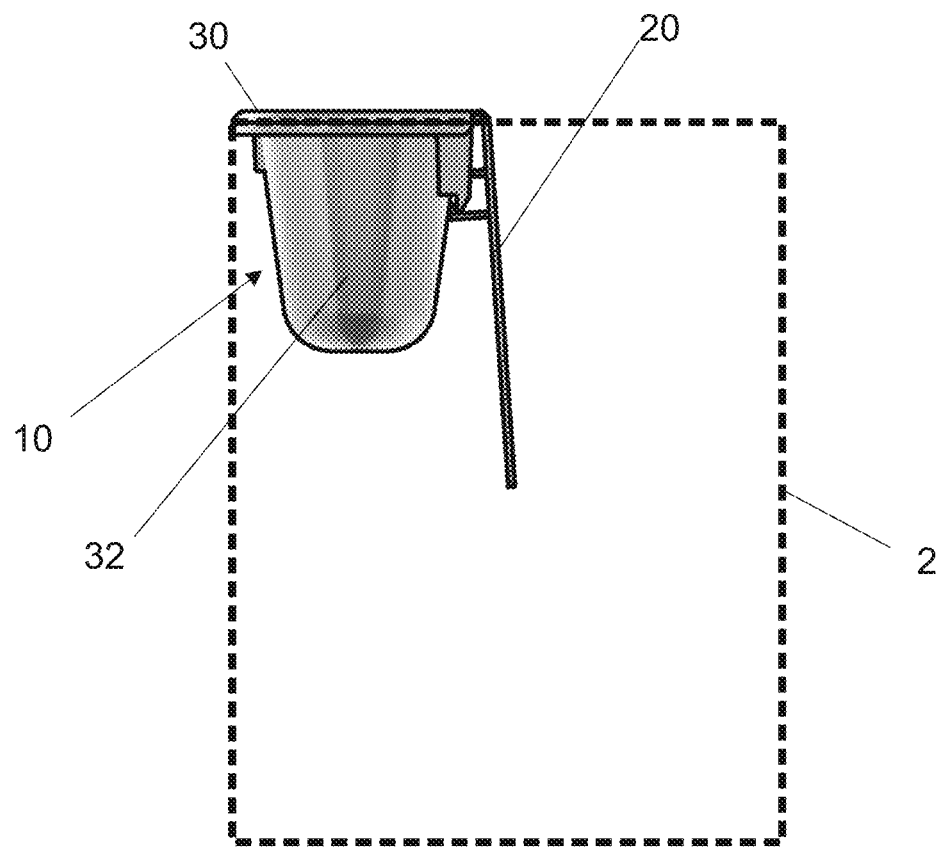
FIG. 6 is a side view showing the position of the paint delivery tray as it would be mounted on top of an open bucket, such as the bucket shown in FIG. 5.

The paint roller grid 20 extends downwardly from the straight edge 36 of the upper shelf 30 in the operative position so that the paint roller grid 30 will extend vertically or downwardly into the bucket 2 on which the paint roller tray 10 is mounted. As seen in FIGS. 5-7 the paint roller tray or paint roller grid 20 comprises an upright rectangular member when mounted in a paint bucket 2. In the preferred embodiment a hinge 50 joins the paint roller grid 20 to the upper shelf 30 along the straight edge 36. Other versions of paint tray in accordance with this invention may not employ this hinge 50, which would allow the paint roller grid 20 to be rotated between an inoperative and an operative position, such as that depicted in FIGS. 1-6. In the preferred embodiment, this hinge 50 is related to a method of manufacturing the paint tray 10, which will be further discussed with reference to FIG. 7.

The paint roller grid 20 has an array of openings 22 formed by a matrix of undulating, interconnecting curved strips 24. Each of these strips 40 extends between opposite sides 26a and 26c of the paint roller grid 20. Multiple rows of strips 40 extend are formed between opposite sides 26b and 26d of the rectangular roller grid 20. The upper grid side 26d is located along the straight edge along which a hinge 50 can be formed. The array of openings 26 and the matrix of strips 24 are the same size as employed on conventional paint roller grids. The openings 26 and the strips 24 will engage a pain roller 4 after it has been dipped into paint in a bucket 2 so that the paint roller grid 20 will evenly distribute paint on the roller 4 and the excess paint removed by the grid 20 will flow downward back into the bottom of the bucket 2. Alternatively, a perforated plate can be employed instead of the grid formed by the matrix of strips 24.

Among the advantages provided by use of the paint delivery tool or paint tray 10 is that a painter need only employ a signal bucket 2, and the paint tray will provide separate spaces for both a paint roller 4 and at least one paint brush 6. This can be especially beneficial when the painter must use a ladder or scaffold because the painter can carry all of his equipment in one hand as he or she climbs, and the single bucket 2 can be positioned in a relatively small space as the painter works. When the painter is on a break or after he or she has finished for the day, he can merely place a top on the bucket without needed to remove all his tools and transfer any remaining paint. Any paint brush 6 will remain in the auxiliary cut bucket 32 without the paint handle 6b being exposed to sticky paint. The tapered cut bucket 32 is also located near the top of the bucket so that a painter does not have to reach down into the bucket and get paint all over his hand.

FIG. 7 show one version of the paint tool 10 in an inoperative configuration in which the paint roller grid 20 extends parallel to the top of the shelf 30. This view depicts one way in which the paint roller grid 20 can be manufactured as a one piece, integral molded unit using a straight draw mold without the need for side pulls. This is a relative inexpensive way to manufacture plastic components. In the inoperative configuration, multiple units may be stacked, with the tapered cut bucket above fitting into the opening of a lower adjacent cut bucket molding. A living hinge 50 can be formed by reducing the thickness of the plastic adjacent the straight edge 36. The paint roller grid 20 can then be rotated clockwise about this hinge 50, as seen in FIG. 7, to the operative position shown in FIGS. 1-6 in which the paint roller grid 20 is beside the auxiliary cut bucket 32. In this position the paint tray 10 can be inserted as a unit into a bucket 2 and mounted on top of the bucket 2 with sufficient clearance for inserting and removing a paint roller 4 in a conventional manner. As seen in FIG. 7 integrally molded L-shaped tabs 28 extend downwardly adjacent opposite sides of the paint roller grid 20. Shoulders 42, as best seen in FIG. 4, are formed on opposite sides of the auxiliary cut bucket 30. The openings 44 on the shelf 30 provide clearance for projections in a mold to form these shoulders 42. When the paint roller grid 20 is rotated into the operative position shown in FIGS. 1-6, the tabs 28 will snap into engagement with the shoulders 42 to secure the paint roller grid into position.

Although FIG. 7 shows on relatively inexpensive way to manufacture the paint tray 10, it should be understood that this is not the only manner in which a paint tray in accordance with this invention can be fabricated. For example, the paint tray does not have to be molded. A stamped and formed, metal embodiment could also be fabricated. It is not essential that the paint roller grid 20 and the auxiliary cut bucket 32 be part of a one-piece member, and separate parts could be snapped together. It is also not necessary that the two parts be hinged. It is also not necessary for the roller grid to be formed by a matrix of strips to form an array of openings. For example slots or openings could be formed in a flat sheet in a manner similar to conventional paint roller grids. Therefore it should be understood that one of ordinary skill in the art could incorporate or modify elements without departing from the invention as disclosed herein. The invention is define by the claims presented herein and is not limited to the preferred or representative embodiment depicted herein.

I claim:

1. A paint delivery tool insertable in a paint bucket for use with a paint roller to apply paint to a structure, the paint delivery tool comprising:
   an upright rectangular member with an uneven surface engagable with the paint roller to evenly distribute the paint on the paint roller moving along and engaging the upright rectangular member;
   a shelf from which the upright rectangular member is suspended, the shelf having a lip engageable with a rim of the paint bucket so that the upright rectangular member can be suspended in the paint bucket;
   an auxiliary paint receptacle formed in the shelf beside upright rectangular member, the auxiliary paint receptacle having a volume sufficient to receive a paint brush in an upright position with paint bristles extending into the paint disposed in the auxiliary paint receptacle wherein the auxiliary paint receptacle comprises a paint storage volume separate from the paint bucket in which the paint brush bristles are submerged;
   wherein the upright rectangular member is movable relative to the auxiliary paint receptacle, while attached to the shelf, from a first horizontal inoperative to a second operative upright position and wherein the upright rectangular member is also attached at its upper end and is movable to the upright position so that the auxiliary paint receptacle and the upright rectangular member can be inserted into the paint bucket with the upright rectangular member while in the upright operative position;
   whereby the paint can be separately contained in the paint bucket and the auxiliary paint receptacle so that a painter can both use and separately store the paint roller and the paint brush while painting the structure while reducing messiness and facilitating clean up.

2. The paint delivery tool of claim 1 wherein the shelf has a semicircular shape with the lip forming an arc so that the paint delivery tool can be mounted on a cylindrical paint bucket.

3. The paint delivery tool of claim 1 wherein the upright rectangular member extends from a straight edge of the shelf.

4. The paint delivery tool of claim 1 wherein the upright rectangular member extends transversely from the shelf so that the upright rectangular member will extend into the paint bucket when the paint deliver tool is mounted on top of the paint bucket.

5. The paint delivery tool of claim 4 wherein the upright rectangular member extends beside the auxiliary paint receptacle when the paint deliver tool is mounted on top of the paint bucket.

6. The paint delivery tool of claim 4 wherein the upright rectangular member is hinged relative to the shelf.

7. The paint delivery tool of claim 6 wherein the upright rectangular member and the shelf are formed as a one piece member with an integral hinge joining the upright rectangular member to the shelf.

8. The paint delivery tool of claim 7 wherein the hinge comprises a living hinge and the shelf and the upright rectangular member being integrally molded.

9. The paint delivery tool of claim 1 wherein openings in the upright rectangular member are formed by a matrix of undulating, interconnecting curved strips.

10. A paint tray for use in a paint bucket and with a paint roller, the paint tray comprising:
    an upper section having a semicircular periphery with a lip configured to fit over a portion of a top edge of the paint bucket when the paint tray is mounted on top of the paint bucket; and
    an upright rectangular member extending downward from the upper section from a straight edge, opposite from the semicircular periphery, to evenly distribute paint on the paint roller moving along the upright rectangular member within the paint bucket when the upper section is mounted on top of the paint bucket, and further comprising an auxiliary paint receptacle is formed on the upper section of the tray so that paint may be stored, separate from the paint bucket for separate access with a paint brush, wherein the upright rectangular member is joined to the auxiliary paint receptacle at its upper end_and is movable from a first inoperative position stable relative to the auxiliary paint receptacle into a second operative upright position transverse to the first inoperative position before insertion of the auxiliary paint receptacle and the upright rectangular member as a unit into the paint bucket so that the upright rectangular member does not engage the paint bucket when inserted therein, and wherein the auxiliary paint receptacle is large enough for storage of at least one paint brush and for a volume of paint sufficient for application to the paint brush.

11. A paint tray mountable on a bucket containing paint and for use with a paint roller and a paint brush, the paint tray comprising:
   an auxiliary paint receptacle on the paint tray but separate from the bucket, the auxiliary paint receptacle configured for positioning the paint brush in the auxiliary paint receptacle in an upright position and configured to apply the paint contained within the auxiliary paint receptacle to the paint brush and to hold the paint in the auxiliary paint receptacle with the paint brush inserted therein;
   a paint roller grid extendable into the bucket when the tray is mounted on the bucket, the paint roller grid having an array of openings formed on the paint roller grid so that the paint roller grid evenly distributes paint on the paint roller moving along the paint roller grid within the bucket when a section including the auxiliary paint receptacle is mounted on top of the bucket;
   wherein a hinge joins a portion of the paint tray containing the auxiliary paint receptacle to the paint roller grid so that the upright rectangular member is rotatable relative to the auxiliary paint receptacle from a first stable inoperative position into a second stable operative upright position and the upright rectangular member extends from the auxiliary paint receptacle at its upper end at a greater angle in the operative position than in the inoperative position so that the upright rectangular member does not engage the paint bucket when inserted the auxiliary paint receptacle and the upright rectangular member are inserted into the paint bucket as a unit.

12. The paint tray of claim 11 comprising a one piece molded member.

13. The paint tray of claim 12 wherein the hinge comprises a living hinge.

14. The paint tray of claim 12 wherein the tray containing the auxiliary paint receptacle includes a peripheral lip for mounting the paint tray on top of the bucket.

15. The paint tray of claim 11 wherein a tab extends from the paint roller grid and is engageable with a shoulder adjacent the auxiliary paint receptacle to secure the paint roller grid beside the auxiliary paint receptacle when the paint tray is in an operative position mountable on the bucket.

16. The paint delivery tool of claim 1 wherein the upright rectangular member comprises a paint roller grid in which an array of openings are formed.

17. The paint tray of claim 10 wherein the upright rectangular member comprises a paint roller grid in which an array of openings are formed.

18. The paint delivery tool of claim 1 wherein the auxiliary paint receptacle has a curved periphery.

19. The paint delivery tool of claim 1 wherein the auxiliary paint receptacle has a curved periphery.

20. A paint delivery tool insertable in a paint bucket for use with a paint roller to apply paint to a structure, the paint delivery tool comprising:
   a paint roller grid for evenly distributing paint on the paint roller moving along and engaging the paint roller grid;
   a shelf from which the paint roller grid extends, the shelf having a lip engageable with a rim of the paint bucket so that the paint roller grid can be suspended in the paint bucket, the paint roller grid being joined to the shelf in a first, initially stable, protruding inoperative position and movable about a hinge to a second stable upright operative position;
   an auxiliary paint receptacle formed in the shelf beside the paint roller grid, the auxiliary paint receptacle having a volume sufficient to receive a paint brush in an upright position with paint bristles extending into paint disposed in the auxiliary paint receptacle;
   multiple paint delivery tools being stackable when the paint roller grid is in the first stable inoperative position and insertable into the paint bucket after the paint roller grid has been moved to the second operative position more upright than the first inoperative position;
   whereby paint can be separately contained in the paint bucket and the auxiliary paint receptacle so that a painter can both use and separately store the paint roller and the paint brush while painting the structure while reducing messiness and facilitating clean up.

\* \* \* \* \*